Nov. 25, 1969 C. H. ALLEN ET AL 3,480,281

METHOD OF PHONOGRAPH RECORD FABRICATION

Filed Feb. 3, 1967 2 Sheets-Sheet 1

CLAYTON H. ALLEN
JOHN C. HEINE INVENTORS

BY Rines and Rines
ATTORNEYS

METHOD OF PHONOGRAPH RECORD FABRICATION

Filed Feb. 3, 1967 2 Sheets-Sheet 2

CLAYTON H. ALLEN
JOHN C. HEINE INVENTORS

BY Rines and Rines
ATTORNEYS

United States Patent Office 3,480,281
Patented Nov. 25, 1969

3,480,281
METHOD OF PHONOGRAPH RECORD FABRICATION

Clayton H. Allen, Wellesley, and John C. Heine, Cambridge, Mass., assignors to Bolt Beranek and Newman Inc., Cambridge, Mass., a corporation of Massachusetts Filed Feb. 3, 1967, Ser. No. 613,873
Int. Cl. G11b 5/86, 7/28
U.S. Cl. 274—3 4 Claims

ABSTRACT OF THE DISCLOSURE

The present invention relates to methods of making phonograph record stampings, being more particularly directed to converting annular records with spiral grooves into linear tape records having substantially parallel recording grooves or tracks with the aid of impressionable, settable resilient plastic materials.

This invention relates to the fabrication of phonograph records and is more particularly, although not exclusively, concerned with converting spiral phonograph record grooves upon an annular portion of a disc record or the like, hereinafter referred to as an annular record, into a substantially linear record strip or tape.

In important applications of relatively inexpensive phonograph records and the like, it is frequently desirable to obtain a substantially linear tape or strip having substantially parallel recorded grooves or tracks which may, for example, contain different recorded messages, as for use in a "talking" toy or the like. While the techniques for recording upon disc tape records are quite conventional and simple, it is more complex to try to produce linear grooves or tracks upon tapes and the like. It is to the problem of converting an easily recorded disc record into a linear record strip with substantially parallel record grooves and the like, without any substantial distortion of the recorded information, that the present invention is accordingly directed.

An object of the invention is to provide a new and improved method of converting spiral phonograph recording grooves upon an annular record into a substantially linear record strip.

A further object is to provide a new method of fabricating phonograph records and the like that is of more general utility, as well.

An additional object is to provide a novel substantially linear record strip.

Figure 1:
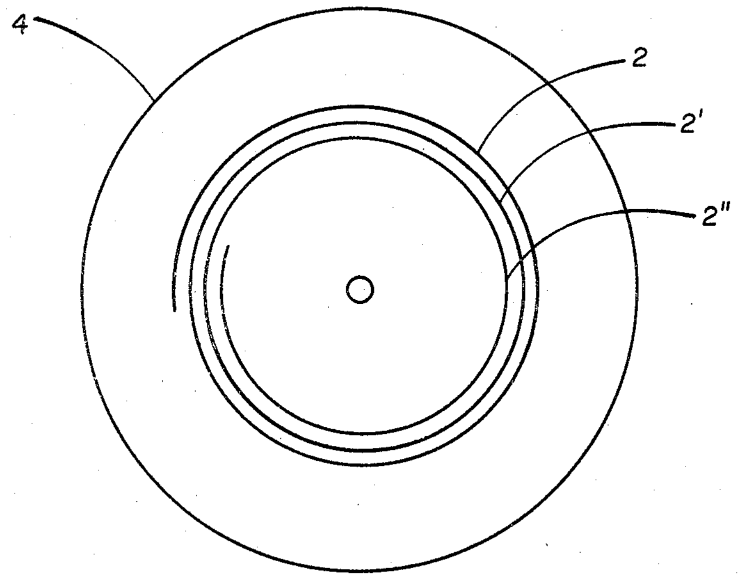
Figures 2, 3:
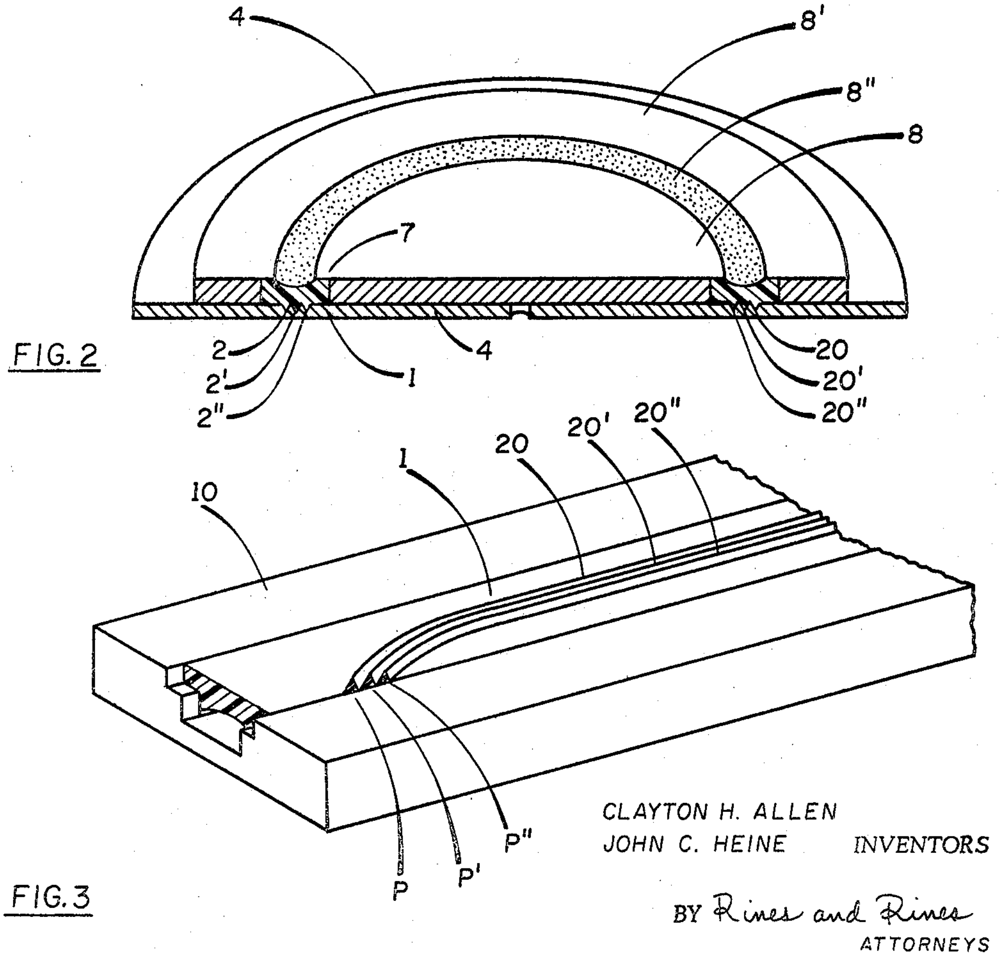
Figure 4:
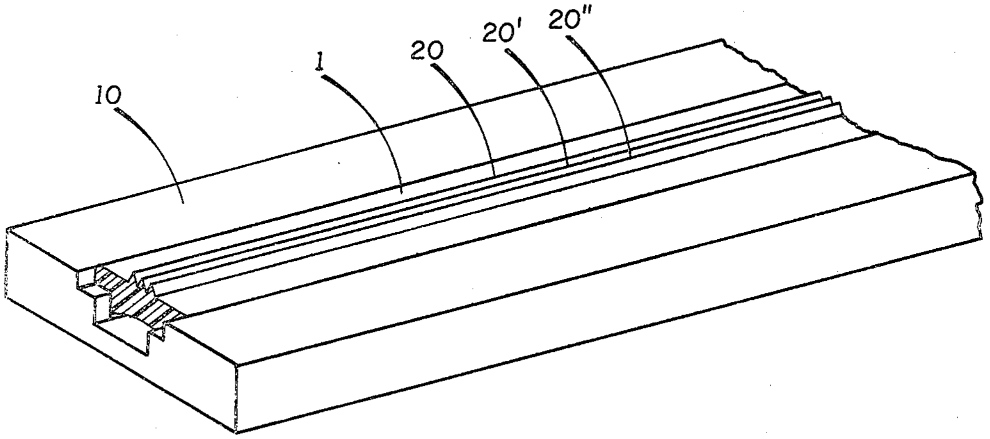
Figure 5:
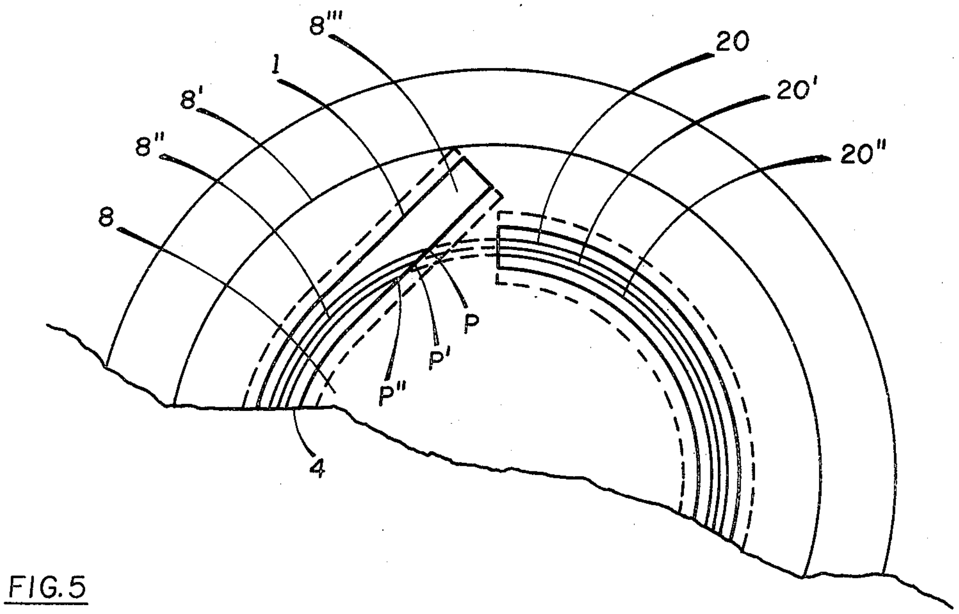

The invention will now be described with reference to the accompanying drawing, FIG. 1 of which is a plan view of a disc or annular type record which it is desired to convert into a substantially linear record strip;

FIGS. 2, 3 and 4 are sectional fragmentized isometric views of preferred method steps in effecting such conversion; and FIG. 5 is a fragmentary plan view of a modified mold.

In summary, the method underlying the invention contemplates flowing an impressionable resilient plastic material upon an annular record containing spiral phonograph grooves to form negative impressions thereof which thereupon set into substantially permanent shape. The material is then constrainingly straightened with a linear channel to hold the same while maintaining the negative groove impressions as substantially parallel linear grooves having negligible distortion from the recorded spiral groove information. A record stamping is then formed from the straightened material. Preferred method steps and constructional features are hereinafter set forth.

Referring to the drawing, a recording disc 4, containing an annular region of preferably substantially uniformly spaced spiral phonograph recording grooves 2, 2′, 2″, etc., (hereinafter sometimes referred to as an annular record) is to be converted, in accordance with the invention, into a substantially linear record strip for more convenient use in, for example, a toy phonograph reproducing system, wherein the phonograph needle is to play upon substantially parallel linearly disposed recording grooves. The annular record 4 is placed at the bottom of a mold comprising an inner disc 8 and an outer ring 8′ defining between them an annular cavity 8″ that is aligned with the recording-groove area, FIG. 2.

An impressionable resilient plastic material 1, such as silicone rubber and the like, is flowed into the cavity 8″ upon the annular record 4 to fill the spiral grooves 2, 2′, 2″, etc., and thus form negative impressions thereof as indicated at 20, 20′, 20″, etc. Such plastic materials thereupon rather readily set following the flowing (or may be heated or otherwise cured to aid in setting, as required, in well known manner), to render the negative impressions 20, 20′, 20″, etc., substantially permanent. The set plastic ring 1, preferably of substantially T-shaped cross-section, formed by the upper lips 7 in the mold elements 8 and 8′ of FIG. 2, is now removed from the mold, as by first removing the inner disc 8; and it may then be transversely slit, preferably in the region of the commencements of recorded messages on each of the record grooves. It is apparent, of course, that the separate recorded messages in the successive tracks need not extend beyond the slit line, so that the slitting of the ring does not interrupt the messages. The slit plastic ring 1 is then constrainingly straightened within a linear channel 10, FIG. 4, (also of T-shaped cross section) into a substantially straight or linear strip, with the negative record groove impressions being maintained as substantially parallel longitudinal linear grooves or tracks 20, 20′, 20″, etc.

Through the use of silicone rubbers and the like, such as those sold under the trademark "Silastic" by Dow-Corning, the process of filling the mold cavity in FIG. 2 and then effecting the self-setting to a degree sufficient to render the negative groove impressions substantially permanent has been found to occur within a few hours. As before stated, of course, the setting may be expedited by heat or other type of curing. When thus adequately set, however, it has been found that the constrained straightening of the type shown in FIG. 4 and above described will introduce negligible distortion into the negative linear record grooves 20, 20′, 20″, as compared with the groove information initially recorded in the spiral grooves 2, 2′, 2″. Further to this end, the substantially T-shaped cross-section of the mold has provided sufficient thickness in the negative impression region to insure the stability above-discussed, irrespective of the degree of filling of the upper portion of the mold cavity 8″. Thus extreme care in the absolute filling of the mold cavity is not imperative in the manufacturing process.

It is also desirable, however, to have the commencements of the separate recorded messages contained in successive spiral grooves start at successively disposed points P, P′, P″, etc., along a common fixed or bottom line or groove of the linear record strip 1, FIGS. 3 and 5, as for the convenience of bringing the reproducing needle always to the same line, through to different successively displaced points therealong for commencing the playback of the different recorded messages on the successive recording grooves. This may be achieved by modifying the mold cavity in the region of the commencement of the recorded messages, as shown at 8‴ in FIG. 5, to cause the plastic to flow transversely across, and thus to intersect the annular record grooves. In this manner, the successive starting points P, P′, P″, etc., of the successive record grooves on the linear strip 1 of FIG. 3 all lie along a common line. The linear strip 1 may now be used to create the tape or strip record stamping by conventional and well-known plating steps, and then forming the plastic stamping master from the plated form. One such conventional process involves chemical deposition of silver upon the plastic strip 1 of FIG. 3 or FIG. 4, with the electrical current applied through the conductive-retaining channel 10, followed by nickel deposition thereupon by conventional electroplating processes. The resulting metal plate is stripped from the plastic form 1 and constitutes a positive master. This master is then plated to from a metal negative, which is separated from it, providing a negative stamping master, all as is well known in the art and unnecessary to detail in the present specification because it does not form a part of the novelty of the present invention.

The resulting linear strip record formed with the system of FIG. 5 will thus have the substantially parallel record grooves corresponding to 20, 20′, 20″, with the successive starting point P, P′, P″, of the grooves lying at successive points along a common line, shown as the bottom line in FIG. 3.

Further modifications will occur to those skilled in the art and all such are considered to fall within the spirit and scope of the invention.

What is claimed is:

1. A method of converting spiral photograph recording grooves upon an annular record into a substantially linear record strip, that comprises, flowing upon the annular record an impressionable resilient plastic material to fill the recording grooves therewith and thus form negative impressions thereof, setting said material to render the negative impressions substantially permanent, constrainingly straightening the same linearly while maintaining the negative groove impressions as substantially parallel linear grooves with negligible distortion from the recorded spiral groove information, and forming a record stamping from the straightened material.

2. A method as claimed in claim 1 and in which the material is selected from silicone rubbers that flow to form an accurate negative impression prior to setting.

3. A method as claimed in claim 1 and in which the said plastic is flowed to intersect across the annular record at a predetermined region thereof to produce successive commencement points for successive of the substantially linear grooves along a common line.

4. A method as claimed in claim 1 and in which the said material is set in substantially T-shaped cross-sectional form.

References Cited

UNITED STATES PATENTS

| | | | |
|---|---|---|---|
| 3,321,208 | 5/1967 | Nicholson | 274—42 |
| 1,792,159 | 2/1931 | Gonzalez | 274—42 |
| 1,358,949 | 11/1920 | Head | 274—3 |

FOREIGN PATENTS

| | | |
|---|---|---|
| 6,220 | 3/1906 | Great Britain. |

LEONARD FORMAN, Primary Examiner

ROGER A. FIELDS, Assistant Examiner

U.S. Cl. X.R.

274—42